(12) United States Patent
Paris et al.

(10) Patent No.: US 9,036,909 B2
(45) Date of Patent: May 19, 2015

(54) PYRAMID COLLAPSE COLOR INTERPOLATION

(71) Applicant: Adobe Systems Incorporated, San Jose, CA (US)

(72) Inventors: Sylvain Paris, Jamaica Plain, MA (US); James McCann, Pittsburgh, PA (US)

(73) Assignee: Adove Systems Incorporated, San Jose, CA (US)

( * ) Notice: Subject to any disclaimer, the term of this patent is extended or adjusted under 35 U.S.C. 154(b) by 165 days.

(21) Appl. No.: 13/815,053

(22) Filed: Jan. 28, 2013

(65) Prior Publication Data
US 2014/0212036 A1 Jul. 31, 2014

(51) Int. Cl.
G06K 9/00 (2006.01)
G06K 9/32 (2006.01)
G06T 3/40 (2006.01)

(52) U.S. Cl.
CPC ............. G06T 3/4092 (2013.01); G06T 3/4084 (2013.01)

(58) Field of Classification Search
USPC .................. 382/167, 279, 294, 295, 299, 300
See application file for complete search history.

(56) References Cited

U.S. PATENT DOCUMENTS

| | | | | |
|---|---|---|---|---|
| 7,076,117 B2* | 7/2006 | Biermann et al. | ............ | 382/285 |
| 7,822,289 B2* | 10/2010 | Szeliski | ........................ | 382/276 |
| 8,295,632 B2* | 10/2012 | Fattal | ............................ | 382/266 |
| 2013/0121618 A1* | 5/2013 | Yadav | ............................ | 382/294 |
| 2013/0223758 A1* | 8/2013 | Hou et al. | ..................... | 382/274 |
| 2014/0219579 A1* | 8/2014 | Lischinski et al. | ............ | 382/279 |

* cited by examiner

*Primary Examiner* — Yon Couso
(74) *Attorney, Agent, or Firm* — Kilpatrick Townsend & Stockton LLP

(57) ABSTRACT

One exemplary embodiment involves receiving an image with a set of undefined pixels and a set of defined pixels and recursively modifying the image to generate a seamless composition comprising only defined pixels. Disclosed are embodiments for recursively modifying the image by recursively down sampling the image by a factor to generate a plurality of down sampled images until the down sampled image generated at each recursive down sampling lacks undefined pixels and then recursively up sampling each one of the down sampled images by the factor to generate an up sampled image from the respective down sampled image. Additionally, at each recursive up sampling instance, pasting the next recursively occurring down sampled image on the up sampled image to generate the next recursively occurring image for up sampling.

17 Claims, 8 Drawing Sheets

(4 of 8 Drawing Sheet(s) Filed in Color)

PYRAMID COLLAPSE COLOR INTERPOLATION

FIELD

This disclosure relates generally to computer software and more particularly relates to the creation, modification, use, and distribution of electronic content.

BACKGROUND

Certain images are incomplete and result in portions of the image that are unclear, missing, and/or otherwise lack information. For example, images received over a network or captured via a camera may degrade and lack information for all pixels of the image resulting in unclear, blurry and/or other incomplete images. These images include a number of undefined pixels where information for those respective pixels is not known and a number of defined pixels where information for those respective pixels is known. In some instances, a system of linear equations may be used to mathematically derive the unknown information of the undefined pixels. The mathematically derived information may then be filled into the undefined pixels to complete the degraded image. Deriving and solving the system of linear equations can require significant computing resources and can require an excessive amount of time to solve for the undefined pixels.

SUMMARY

Disclosed are embodiments for recursively modifying an image with defined and undefined pixels to generate a modified image with a seamless composition comprising no undefined pixels. Disclosed are embodiments for receiving an original image comprised of a plurality of pixels, the image having a plurality of undefined pixels and a plurality of defined pixels; recursively down sampling the image by a factor to produce a plurality of down sampled images until the down sampled image produced at each recursive down sampling instance lacks undefined pixels; storing each recursively down sampled image, wherein a smallest down sampled image lacks undefined pixels; recursively up sampling each one of the down sampled images by the factor to create an up sampled image from the respective down sampled image; and at each recursive up sample instance, pasting the next recursively occurring down sampling image on top of the up sampled image to create the next recursively occurring image for up sampling.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

The file of this patent contains at least one drawing executed in color. Copies of this patent with color drawing(s) will be provided by the Patent and Trademark Office upon request and payment of the necessary fee. These and other features, aspects, and advantages of the present disclosure are better understood when the following Detailed Description is read with reference to the accompanying drawings, where.

DETAILED DESCRIPTION

Methods and systems are disclosed for quickly and accurately determining pixel information for undefined pixels of an incomplete image. The disclosed embodiments can require less computing resources than previous methods and can determine the undefined pixels at a faster rate. Recursive interpolation of the incomplete image combined with extraction from interpolated images at recursive instances, as described herein, provides the pixel information for the undefined pixels. The resulting image is a seamless composition with fewer or no gaps in the image with missing pixel information. The approaches described herein provide the seamless composition using less computing resources than the system using linear equations. Disclosed are embodiments for receiving an image (126 in FIG. 2) with a number of undefined pixels (206 in FIG. 2) and a number of defined pixels (203 in FIG. 2) and applying the recursive approach disclosed herein to create a version of the image (FIG. 3) with pixel information for the undefined pixels. For example, the undefined pixels may be filled in with a recursive average of the information associated with any adjacent pixels. In one embodiment, an interpolation application interpolates the information for the undefined pixels by recursively down sampling the received image by a factor of two to create a Gaussian pyramid until there are no undefined pixels remaining in the resulting down sampled image. The interpolation application then recursively up samples the down sampled images by a factor of two starting from the smallest down sampled image to produce up sampled images. At each recursive instance, the interpolation application pastes the up sampled image together with the next down sampled image and fills in the undefined pixels of the down sampled image with the corresponding defined pixels of the up sampled image. The interpolation application continues up sampling the images of the pyramid until all of the down sampled images have been processed. The resulting image represents a modified version of the original image where the undefined pixels of the original image are filled in with the recursive averages of the adjacent defined pixels.

These illustrative examples are given to introduce the reader to the general subject matter discussed here and are not intended to limit the scope of the disclosed concepts. The following sections describe various additional embodiments and examples with reference to the drawings in which like numerals indicate like elements.

Figure 1:
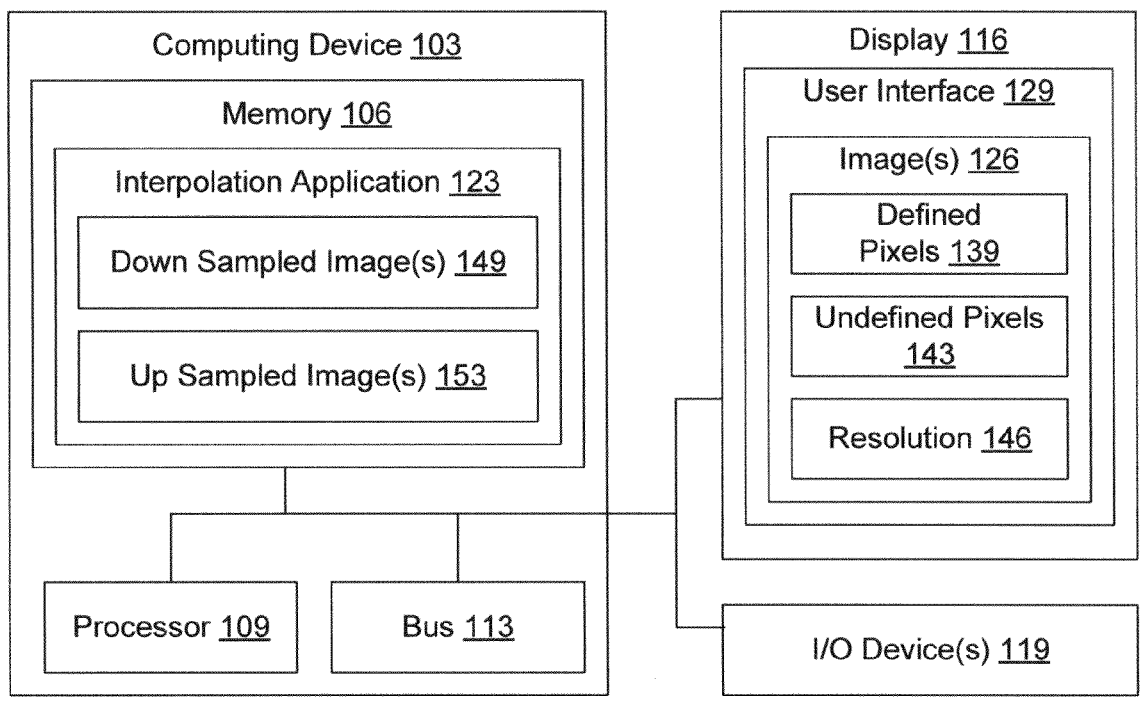
FIG. 1 is a block diagram depicting exemplary computing devices in an exemplary computing environment for implementing certain embodiments.

FIG. 1 is a block diagram depicting an exemplary computing device in an exemplary computing environment for implementing certain embodiments. The methods and systems disclosed herein are also applicable on other computing systems and environments. The environment shown in FIG. 1 includes a computing device 103 having a memory 106, a processor 109, a bus 113, a display 116, and a plurality of input/output devices 119. In one embodiment, the input/output device 119 may include a number of external or internal devices such as a mouse, a CD-ROM, DVD, a keyboard, a display, audio speakers, one or more microphones, a stylus, or any other input or output devices. Additionally, the computing device 103 may be a personal computing device, a mobile device, or any other type of electronic devices appropriate for providing one or more of the features described herein. Further, the computing device 103 may be a touch computing device, such as a tablet computer, that includes a touch screen for receiving input. In this example, the input/output device 119 also includes the touch screen for receiving input.

As used here, the term "device" refers to any computing or other electronic equipment that executes instructions and includes any type of processor-based equipment that operates an operating system or otherwise executes instructions. A device will typically include a processor 109, which may comprise one or more processors, that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tables, laptop computers, tablet computers, Internet appliances, other processor-based devices, and television viewing devices. The exemplary computing device 103 may be used as special purpose computing devices to provide specific functionality offered by applications and modules.

As used herein, the term "application" refers to any program instructions or other functional components that execute on a device. An application may reside in the memory 106 of a device that executes the application. As is known to one of skill in the art, such applications may be resident in any suitable computer-readable medium and execute on a suitable processor. For example, as shown the computing device 103 has a computer-readable medium such as the memory 106 coupled to the processor 109 that executes computer-executable program instructions and/or accesses stored information. Such a processor 109 may include a microprocessor, an ASIC, a state machine, or other processor, and can be of any number of computer processors. Such processors include, or may be in communication with, a computer-readable medium which stores instructions that, when executed by the processor, cause the processor to perform the steps described herein.

As used herein, the term "down sampling" refers to an image operation that decreases the number of pixels in an image by filtering and then removing the pixels from the image to create the down sampled image. Any number of filters may be used to implement the filtering as known in the art. For example, some filters may be faster than others but produce a filtered image that is of a lesser quality than a slower filter. As an example, a 3×3 tent filter is a faster filter than a 5×5 Gaussian filter but produces a filtered image that is of a lesser quality in relation to the filtered image produced from the Gaussian filter.

As used herein, the term "up sampling" refers to an image operation that increases the number of pixels in an image by adding pixels to the image and then filtering the image to create the up sampled image. Any number of filters may be used to implement the filtering as known in the art. For example, some filters may be faster than others but produce a filtered image that is of a lesser quality than a slower filter. As an example, a 3×3 tent filter is a faster filter than a 5×5 Gaussian filter but produces a filtered image that is of a lesser quality in relation to the filtered image produced from the Gaussian filter.

As used herein, the term "over function" refers to a compositing operator that overlays and/or pastes two images on top of each other and identifies undefined pixels in a first image to be replaced with corresponding defined pixels in the second image. For example, the over function may paste undefined pixels of a foreground image onto a background image, or vice versa.

As used herein, the term "seamless" refers to a complete image and/or composition with no undefined pixels. All of the pixels in the image include pixel information and thus the seamless image does not include any gaps in pixel information thereby providing a smooth and complete image with no undefined pixels.

The memory 106 represents a computer-readable medium that may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

In one embodiment, the memory 106 includes an interpolation application 123 and/or other applications. The interpolation application 123 receives an image 126 and fills in undefined portions of the image with a smooth and blended transition of colors from the non-undefined portions of the image via interpolation by producing a number of down sampled images 149 and a number of up sampled images 133, as will be described. Additionally, an application such as a browser may render a user interface 129 on the display 116 associated with the computing device 103. The user interface 129 may depict the image 126. The image 126 may include a number of defined pixels 139 and a number of undefined pixels 143. For example, defined pixels 139 may be any pixel of the image 126 with known information, such as, a color value. The undefined pixels 143 may be any pixel of the image 126 with unknown information. Additionally, each image 126 has a resolution 146 that may be defined by the number of pixels (defined pixels 139 and undefined pixels 143) on each of the dimensions of the image 126.

In one embodiment, the interpolation application 123 fills in the undefined pixels 143 of the image 126 by repeatedly averaging the information of any defined pixels 139 adjacent to each of the undefined pixels 143. For example, the interpolation application 123 recursively down samples the image 126 to create a Gaussian pyramid that includes number of down sampled images 149. In one embodiment, the interpolation application 123 down samples the original image 126 by a factor of two such that the first down sampled image 149 is half of the resolution 146 as the original image 126. For instance, the interpolation application 123 may create the first down sampled image 149 from every other pixel of the original image 126. Accordingly, a number of the defined pixels 139 and a number of the undefined pixels 143 may not appear in the first down sampled image 149. In another embodiment, the interpolation application 123 may down sample the original image 126 by a factor other than two. For instance, the interpolation application 123 may down sample the original image 126 by a factor of three or any other factor. In the example where the factor is three, the interpolation application 123 down samples the original image 126 by removing every third pixel from the original image 126.

On the next recursive instance, the interpolation application 123 down samples the first down sampled image 149 to create a second down sampled image 149 where the second down sampled image 149 is half of the resolution 146 as the first down sampled image 149. The interpolation application 123 proceeds with recursively down sampling by a factor of two (or by the same factor as the previous down sampling) until there are no more undefined pixels 143 remaining in the down sampled image 149. For instance, the interpolation application 123 may determine whether there are any undefined pixels 143 in the down sampled image 149 upon each recursive instance of down sampling. Upon determining that there are no undefined pixels 143 in the down sampled image 149, the interpolation application 123 stops the recursive down sampling. The last down sampled image 149 in the set of recursively down sampled images 149 has the smallest resolution 146 with respect to the other down sampled images 149 and therefore is the smallest down sampled image 149. Additionally, each one of the down sampled images 149 produced during the recursive down sampling may be stored in the memory 106.

The interpolation application 123 then recursively up samples the down sampled images 149 to create a modified version of the original image 126 with all of the undefined pixels 143 filled in based at least in part on the defined pixels 139. The modified version of the original image 126 is void of any undefined pixels 143 thereby embodying a seamless composition full of defined pixels 139. In one embodiment, the interpolation application 123 initiates the up sampling with the smallest down sampled image 149. The smallest down sampled image 149 lacks any undefined pixels 143 as previously discussed. The interpolation application 123 up samples the smallest down sampled image 149 by a factor of two (or by another factor previously used for down sampling) to create a first up sampled image 153. In one embodiment, the first up sampled image 153 has twice the resolution 146 of the smallest down sampled image 149. For example, each pixel of the smallest down sampled image 149 is up sampled to produce a 2×2 block of pixels in the first up sampled image 153. Additionally, only defined pixels 139 are present in the smallest down sampled image 149 and therefore only defined pixels 139 will be present in the first up sampled image 153.

Next, the interpolation application 123 implements an over function to paste the second smallest down sampled image 149 on top of the first up sampled image 153. As discussed above, the smallest down sampled image 149 may include one or more undefined pixels 143. In one embodiment, the interpolation application 123 implements the over function by pasting the first up sampled image 153 over the second smallest down sampled image 149. For example, the first up sampled image 149 is the "foreground" while the second smallest down sampled image 149 is the "background." To this end, the interpolation application 123 identifies portions of the second smallest down sampled image 149 that include undefined pixels 143 and pastes the defined pixels 139 in the corresponding portion of first up sampled image 153 onto the second smallest down sampled image 149 to create a modified second smallest down sampled image 149. The modified second smallest down sampled image 149 does not include any undefined pixels 143 upon implementation of the over function. For instance, the undefined pixels 143 are replaced by the corresponding defined pixels 139 from the first up sampled image 153. In one embodiment, the defined pixels 139 from the first up sampled image 153 represents an average of the pixels adjacent to the undefined pixels 143 as determined from the smallest down sampled image 149.

On the next recursive instance, the interpolation application 123 up samples the modified second smallest down sampled image 149 by a factor of two (or by another factor previously used for up sampling) to create a second up sampled image 153. The second up sampled image 153 does not include any undefined pixels 143. The interpolation application 123 then implements the over function by pasting the second up sampled image 153 over the third smallest down sampled image 149 and replacing any portions of the third smallest down sampled image 149 that include undefined pixels 143 with defined pixels 139 from the corresponding portion of the second up sampled image 153 to create a modified third smallest down sampled image 149. The interpolation application 123 continues recursively up sampling and implementing the over function on the down sampled images 149 up the pyramid until all of the down sampled images 149 have been processed. For example, all of the down sampled images 149 will be processed when the largest down sampled image 149 is up sampled and used to implement the over function to create the modified largest down sampled image 149. The modified largest down sampled image 149 represents the version of the original image 126 with all of the undefined pixels 143 recursively filled in with averages of any adjacent defined pixels 139 to create the smooth and blended version of the original image 126.

The functionality of the interpolation application 123 may be described in pseudo code as follows. In one embodiment, the interpolation application 123 implements the functionality of the Interpolate( ) function, the InterpolateRec( ) function and the Over( ) function. The Interpolate( ) function is the driver function and may be described as follows:

Interpolate (Image X with alpha A):
   P <- X * A' ;
   (P', A') <- InterpolateRec (P, A) ;
   X' <- P'/A' ;
   return (X',1) ;

In the function described above, the image is represented by 'X' and the alpha is represented by 'A.' Alpha may be a vector having a length and/or a matrix having a size that corresponds to the number of pixels in the image X. Each entry in the vector, matrix, and/or other mathematical structure may indicate whether the information of the respective pixel in the image X is known. For instance, an alpha value of 0 indicates that no information of the pixel associated with that particular entry in the mathematical structure is known. Similarly, an alpha value of 1 indicates that the information of the pixel associated with that particular value in the mathematical structure is known. In one embodiment, the alpha may be represented by a Boolean value.

The Interpolate( ) function first calls for a premultipled alpha (P) for notational convenience where any color information for unknown pixels is discarded. Next, the Interpolate( ) function calls the InterpolateRec( ) function that implements the recursive down sampling, up sampling and pasting of the image X to produce modified image X', as will be described. The value returned from the InterpolateRec( ) function is stored as (P', A'). The modified image X' is then derived by moving back to the non-premultiplied alpha by dividing by A' and then returning the modified image X' that includes only defined pixels 139 (i.e., has an alpha of 1).

The InterpolateRec( ) function may be described as follows:

```
InterpolateRec(Image P with alpha A):
    if size(P) == 1×1:
        return (P, A);
    (Ps,As) = Downsample(P,A)
    (Ps',As') = InterplateRec(Ps,As);
    return Over ((P,A), Upsample (Ps', As'));
```

In the function described above, the InterpolateRec( ) function receives the image P which is the premultipled alpha P version of the image X and the alpha A associated with the premultiplied alpha P version. The InterpolateRec( ) function then determines whether the pixel size of the image P is equal to a 1×1 resolution. For example, the recursive down sampling may have reduced the size of the image to only one pixel in size. If the InterpolateRec( ) function determines that the resolution of the image P is 1×1, then the recursion is complete and (P, A) is returned. In another embodiment, the InterpolateRec( ) function may determine whether any of the pixels of the image P are undefined pixels 143. If the InterpolateRec( ) function determines that no undefined pixels 143 are present, then the recursion is complete and (P, A) is returned.

If the InterpolateRec( ) function instead determines that the resolution of the image P is not 1×1 or that the image P includes undefined pixels 143, then the InterpolateRec( ) function proceeds to implement a down sampling function on (P, A). In one embodiment, the down sampling function reduces the size of the image P by a factor of 2 (i.e., reduces the resolution of the image P by half) to produce a down sampled result (Ps, As). Next, the InterpolateRec( ) function recursively calls itself with (Ps, As) as the input image and alpha and stores the result as (Ps', As') until the condition as defined by the if statement is satisfied.

Upon satisfying the condition to stop the recursive down sampling, the InterpolateRec( ) function next implements the Over( ) function using the returned (P, A) value and the result of up sampling the image identified as (Ps', As'). In one embodiment, the up sampling function increases the size of the image Ps' by a factor of 2 (i.e., multiplies the resolution of the image Ps' by two) to produce the up sampled image, as described above. The Over( ) function can be any one of a number of standard over( ) functions known in the art. As one example, the Over( ) function may be implemented as:

```
Over( Image Fg with alpha FgA, image Bg with alpha BgA):
    return (Fg + (1 − FgA) * Bg, FgA + (1 − FgA) * BgA);
```

In the function above, Fg represents the foreground image, FgA represents the alpha of the foreground image Fg, Bg represents the background image, and BgA represents the alpha of the background image Bg. As another example, the Over( ) function may be implemented as:

```
Over (image Fg with alpha FgA, image Bg with alpha BgA):
    for image location i:
        if FgA(i) > 0:
            R(i) = Fg(i);
            RA(i) = FgA(i);
        else:
            R(i) = Bg(i);
            RA(i) = BgA(i);
    return (R, RA);
```

In the function above, the image location i represents a pixel location within the foreground image FgA. The R represents the returned image that is produced by the Over( ) function. A number of other Over( ) functions may be known in the art and may be interchangeable with the Over( ) functions described above.

Figure 2:
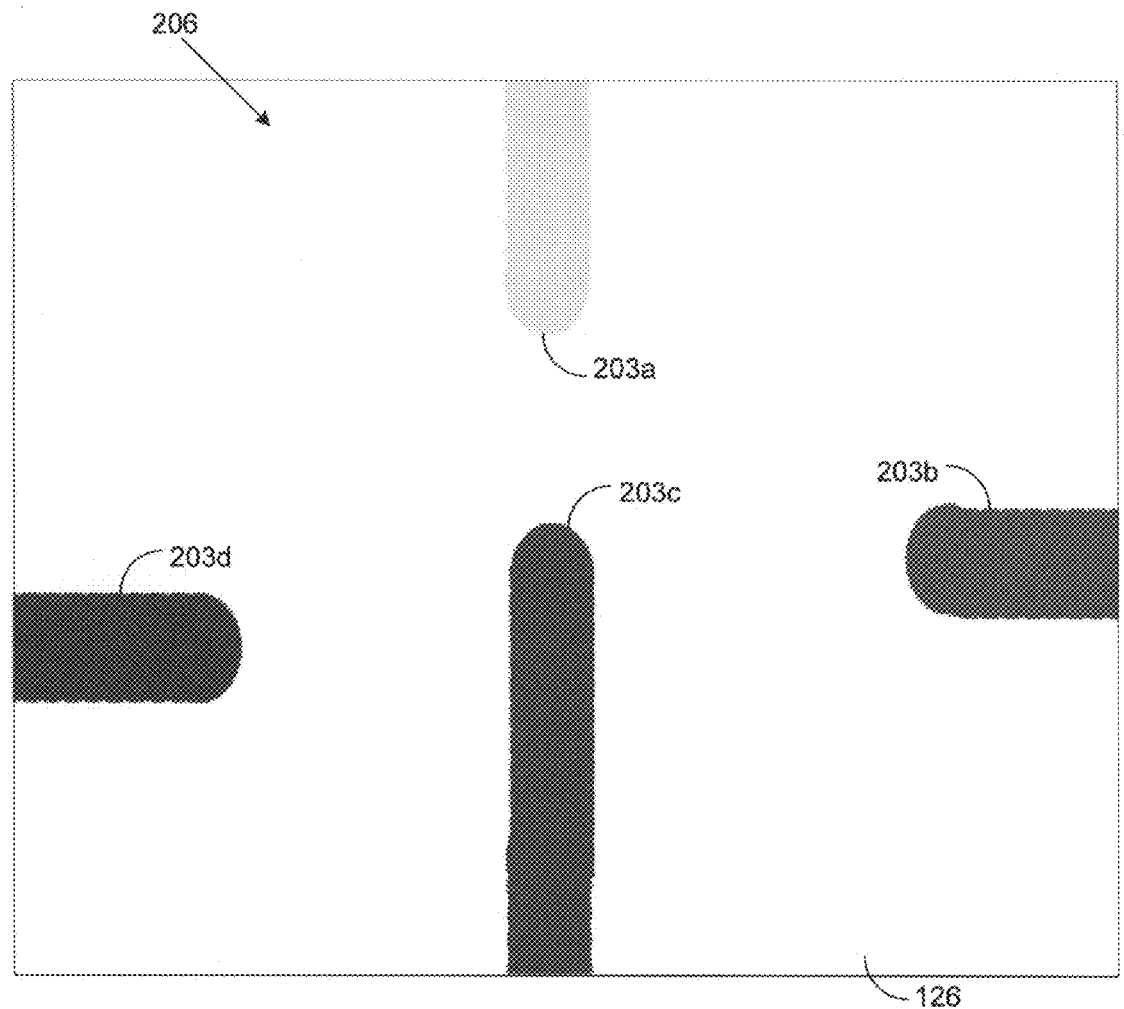
FIG. 2 is an illustration of an image that includes a number of undefined pixels and a number of defined pixels.

FIG. 2 shows one example of a user interface 129 (FIG. 1) according to certain embodiments of the present disclosure that is rendered on the display 116. The user interface 129 shown in FIG. 2 includes an image 126 with a color portions 203a, 203b, 203c, and 203d, and other portion 206. For example, the color portions 203a, 203b, 203c and 203d include defined pixels 139 (FIG. 1) where the pixels that form the respective color portions include color information. The other portion 206 includes only undefined pixels 143 (FIG. 1) where the pixels that form the other portion include no color information. In this example, the color portion 203a includes yellow colored defined pixels 139, the color portion 203b includes blue colored defined pixels 139, the color portion 203c includes blue colored defined pixels 139 and the color portion 203d includes red colored defined pixels 139. The other portion 206 does not include any defined pixels 139 and thus may not be visible.

Figure 3:
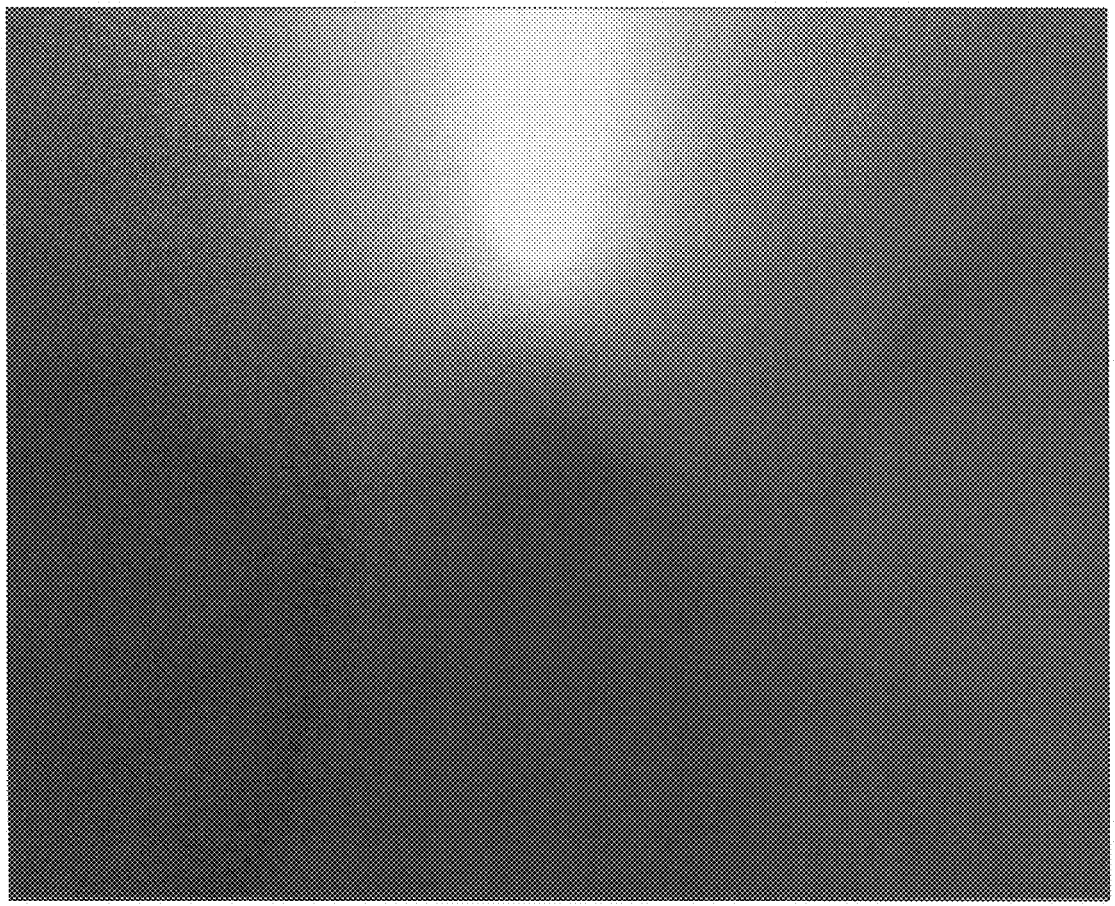
FIG. 3 is an illustration of an image with the undefined pixels filled in by recursively averaging the values of any adjacent defined pixels.

FIG. 3 shows one example of a user interface 129 (FIG. 1) according to certain embodiments of the present disclosure that is rendered on the display 116. The user interface 129 shown in FIG. 3 includes a version of the image 126 that has been modified by the interpolation application 123 (FIG. 1) to fill in the undefined pixels 143 (FIG. 1) of the original image 126 (as shown in FIG. 2) with recursively averaged values of any adjacent defined pixels 139 (FIG. 1) as discussed above. As shown in FIG. 3, the undefined pixels 143 of the original image 126 as shown in FIG. 2 are recursively replaced with any defined pixels 139 adjacent to the undefined pixels 143 thereby creating a modified image 126 with a seamless composition of only defined pixels 139.

Figure 4:
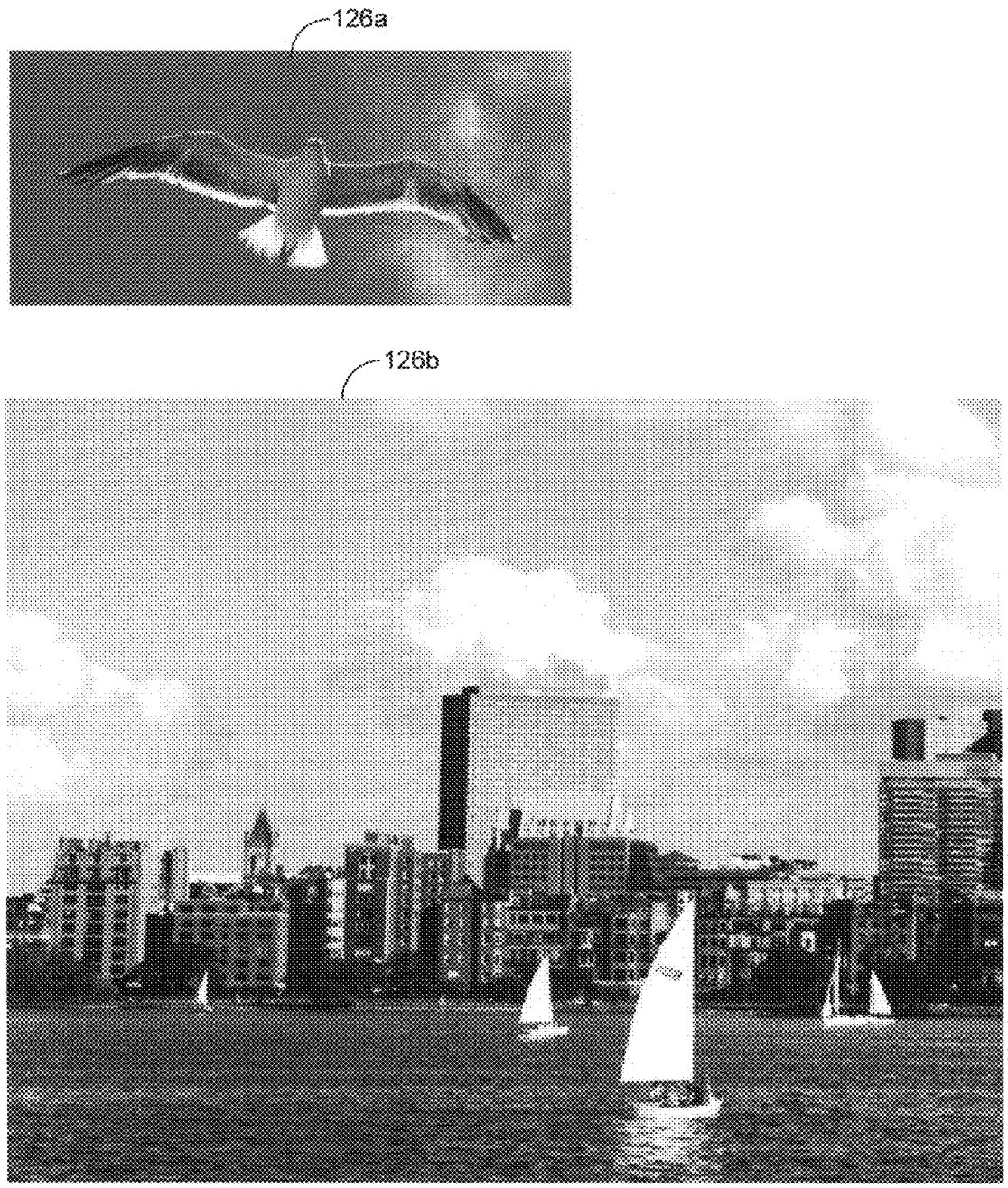
FIG. 4 is an illustration of a first image and a second image having different background colors that may be blended together to create a seamless transition according to certain embodiments described herein.

FIG. 4 shows one example of a user interface 129 (FIG. 1) according to certain embodiments of the present disclosure that is rendered on the display 116. The user interface 129 shown in FIG. 4 depicts a first image 126a and a second image 126b where the first image 126a may be pasted onto the second image 126b. The first image 126a depicts a bird and a background having a first shade of blue. The second image 126b depicts a skyline and a background having a second shade of blue. According to certain embodiments described herein, the interpolation application 123 may paste the first image 126a onto the second image 126b while blending the differences in the first shade of blue in the first image 126a and the second shade of blue in the second image 126b via the interpolation application 123 (FIG. 1) to create a modified image 126 having a seamless composition of blue. The modified image 126 includes the bird of the first image 126a with a background that smoothly transitions into the background of the second image 126b.

Figure 5:
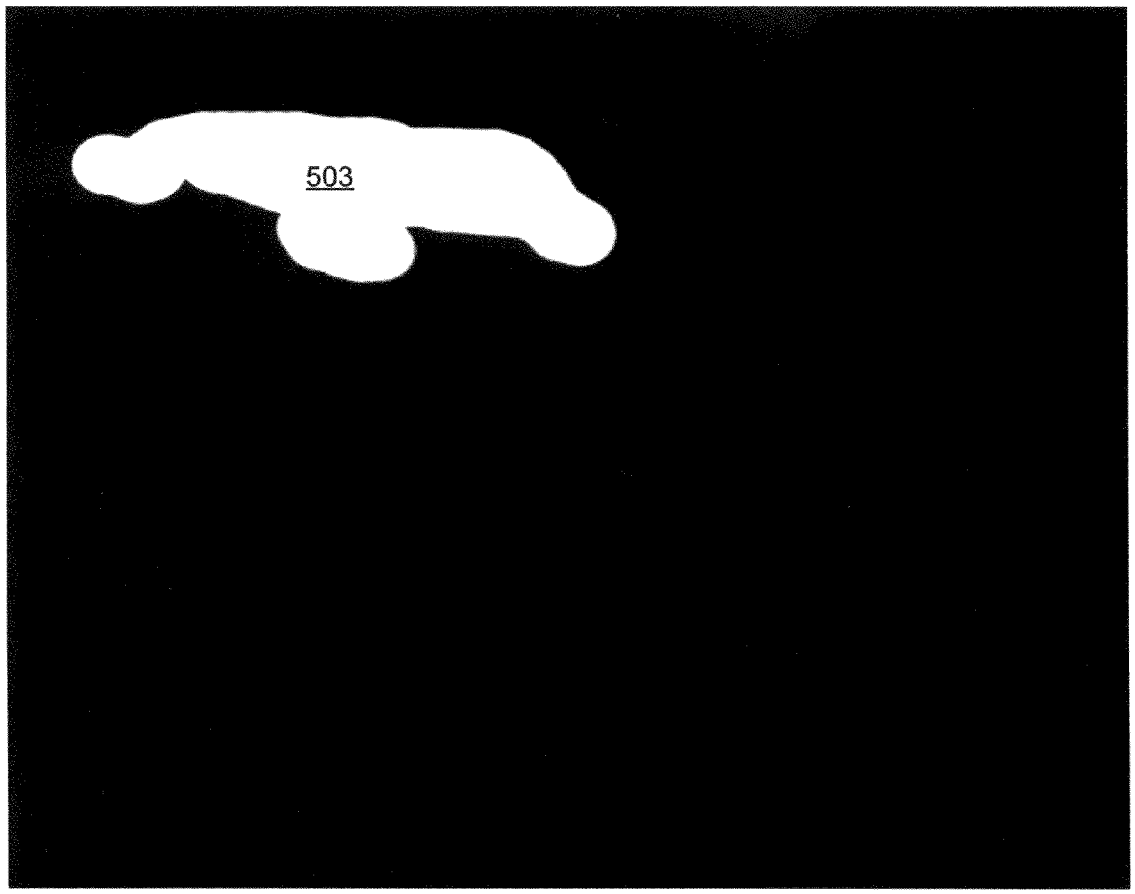
FIG. 5 is an illustration of a relevant portion of the first image to be inserted onto the second image.

FIG. 5 illustrates a portion of the first image 126a (FIG. 1) that is extracted for pasting on top of the second image 126b (FIG. 4). In one embodiment, a user operating the computing device 103 (FIG. 1) may specify a portion 503 of the first image 126a to be extracted via one or more I/O devices 119 (FIG. 1) and the user interface 129 (FIG. 1). For instance, the user may select the boundary of the portion 503 via a mouse, a stylus, a touch screen display associated with the computing device 103, and/or any other input device 119. In one embodiment, the interpolation application 123 (FIG. 1) may receive the portion 503 specified by the user and extract the specified portion 503 to implement the pasting operation, as will be described with respect to FIG. 6.

Figure 6:
FIG. 6 is an illustration of the first image and the second image together with two different background colors having been seamlessly blended together according to certain embodiments disclosed herein.

FIG. 6 illustrates the modified second image 126b with the portion 503 extracted from the first image 126a (FIG. 4) pasted on top of the second image 126b. As shown in FIG. 6, the interpolation application 123 (FIG. 1) produced the modified second image 126c with the background of the portion 503 (FIG. 5) of the first image 126a blended in a smooth transition with the background of the second image 126b. In one embodiment, the interpolation application 123 pastes the extracted portion 503 from the first image 126a on top of the original second image 126b. For example, the interpolation application 123 may paste the extracted portion 503 by implementing any number of standard pasting operations known in the art. The interpolation application 123 may then identify a boundary between pasted portion 503 and the second image 126b. In one embodiment, the interpolation application 123 identifies the boundary based at least in part on a color differential between the background of the extracted portion 503 and the background of the second image 126b. For instance, the interpolation application 123 may determine if the color differential between two adjacent pixels exceeds a predetermined threshold value. If the color differential exceeds the predetermined threshold value, then the interpolation application 123 may determine that the two adjacent pixels form the boundary.

Next, the interpolation application 123 produces the modified second image 126c with a seamless transition between the background of the original second image 126b and the background of the first image 126a. In one embodiment, the interpolation application 123 identifies the boundary between the original second image 126b and the first image 126a, and a surrounding portion of the boundary, to implement the approach described herein for creating the seamless composition depicted in FIG. 6. The interpolation application 123 may identify the shade of blue in the background of the first image 126a to be the undefined pixels 143 and the shade of blue in the background of the original second image 126b to be the defined pixels 139. Then, the interpolation application 123 recursively down samples the boundary and the surrounding portion of the boundary by a factor. For example, the interpolation application 123 may recursively down sample by a factor of two and/or any other factor, as described above. Upon recursively down sampling until computing a down sampled image 149 that includes no undefined pixels 143, the interpolation application 123 recursively up samples and implements the over function until all of the down sampled images 149 are processed. The resulting modified image 126c shown in FIG. 6 represents a seamless composition where the first shade of blue of the first image 126a is indistinguishable from the second shade of blue of the second image 126b.

Figure 7:
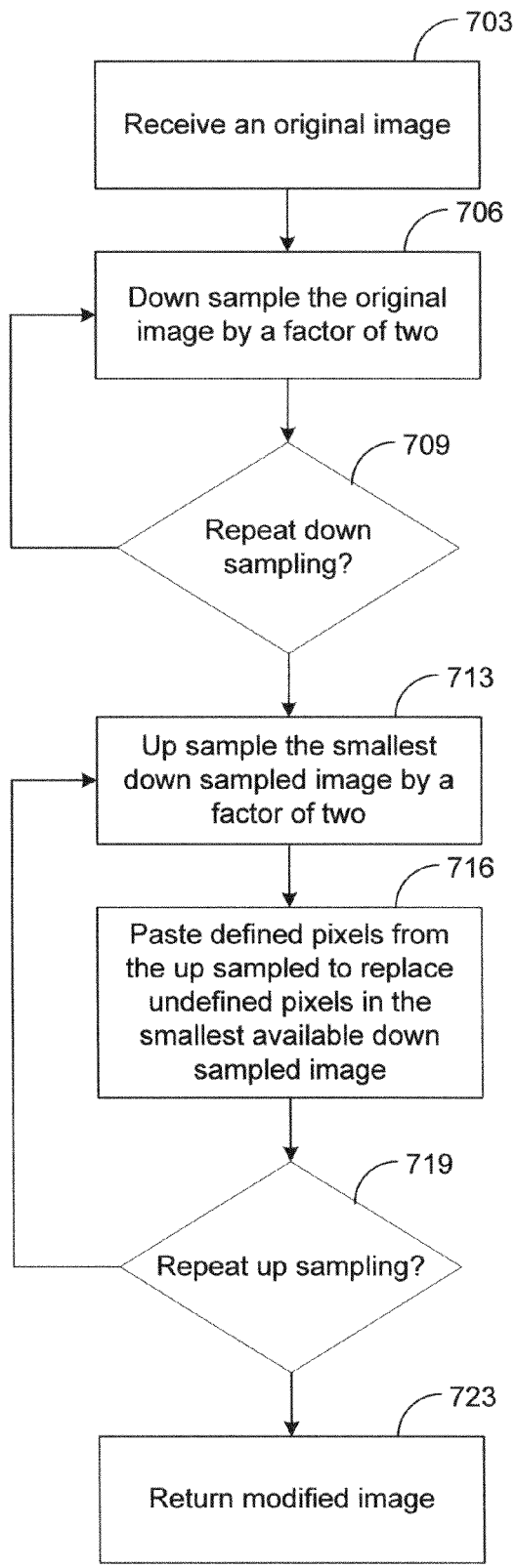
FIG. 7 is a flowchart illustrating an exemplary method for creating a seamless transition between defined regions, thereby filling in the undefined regions using defined portions of an image.

FIG. 7 is a flowchart that provides one example of the operation of a portion of the interpolation application 123 according to certain embodiments. It is understood that the flowchart of FIG. 7 provides merely an example of the many different types of functional arguments that may be employed to implement the operation of the portion of the interpolation application 123 as described herein. As an alternative, the flowchart of FIG. 7 may be viewed as depicting an example of steps of a method implemented in the computing device 103 (FIG. 1) according to one or more embodiments.

Beginning with step 703, the interpolation application 123 receives an image 126 (FIG. 1) having a number of undefined pixels 143 (FIG. 1) and a number of defined pixels 139 (FIG. 1). The interpolation application 123 fills in the undefined pixels 143 by recursively averaging the values of any adjacent defined pixels 139 to produce a modified image 126a. To this end, the interpolation application 123, in step 706, down samples the original image 126 by a factor of two to produce a first down sampled image 149 (FIG. 1) that is half the resolution 146 (FIG. 1) of the original image 126. For example, the interpolation application 123 may use every other pixel of the original image 126 to create the first down sampled image 149. In another embodiment, the interpolation application 123 may reduce the original image 126 by a different factor.

Next, in step 709, the interpolation application 123 determines whether to repeat the down sampling. In one embodiment, the interpolation application 123 determines whether there are any undefined pixels 143 in the down sampled image. If the interpolation application 123 determines that the down sampled image includes undefined pixels 143, then the interpolation application 123 returns to step 706 to down size image again. For example, the interpolation application 123 down sizes the first down sampled image 149 by a factor of two to create a second down sampled image 149. In another embodiment, the interpolation application 123 determines whether to repeat the down sampling based on the size of the down sampled image. For example, if the interpolation application 123 determines that the size of the down sampled image is large than 1×1, then the interpolation application 123 returns to step 706 to down sample the down sampled image 149. Additionally, the interpolation application 123 may store each down sampled image 149 at each recursive instance.

If the interpolation application 123 determines that the down sampling does not need to be repeated (i.e, the recursive down sampling may stop), then the interpolation application 123 advances to step 713. In step 713, the interpolation application 123 up samples the down sampled images 149 from the smallest down sampled image 149. For example, the interpolation application 123 up samples the down sampled images 149 by a factor of two, as discussed above, to create an up sampled image 153 (FIG. 1). Then in step 716, the interpolation application 123 pastes the next smallest down sampled image 149 on top of the up sampled image 153 and replaces any undefined pixels 143 in the next smallest down sampled image 149 with the corresponding defined pixels 139 of the up sampled image 153. For example, an over( ) function may implement this technique to create a modified up sampled image 153.

In step 719, the interpolation application 123 determines whether to repeat the up sampling. For example, the interpolation application 123 may determine to repeat the up sampling if there are remaining down sampled images 149 that can be processed. If the interpolation application 123 determines to repeat the up sampling, then the interpolation application 123 returns to step to repeat the up sampling. If the interpolation application 123 determines that the up sampling does not need to be repeated, then the interpolation application 123 advances to step 723 and returns the last modified up sampled image 153. The returned image will be a modified version of the original image 126 with the undefined pixels 143 filled in with recursively averaged adjacent defined pixels 139.

Figure 8:
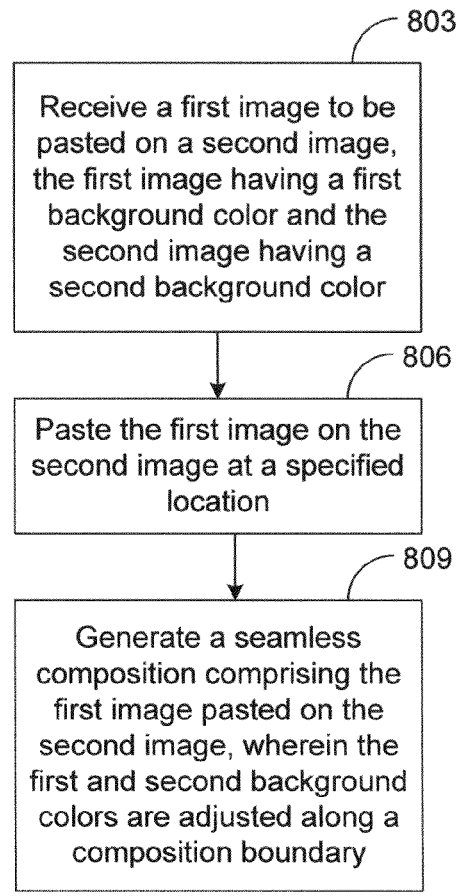
FIG. 8 is a flowchart illustrating another exemplary method for creating a seamless transition between defined regions, thereby filling in the undefined regions using defined portions of an image.

FIG. 8 is a flowchart that provides one example of the operation of a portion of the interpolation application 123 according to certain embodiments. It is understood that the flowchart of FIG. 8 provides merely an example of the many different types of functional arguments that may be employed to implement the operation of the portion of the interpolation application 123 as described herein. As an alternative, the flowchart of FIG. 8 may be viewed as depicting an example of steps of a method implemented in the computing device 103 (FIG. 1) according to one or more embodiments.

Beginning at step 803, the interpolation application 123 receives a first image that is to be pasted on a second image. The first image has a first background color and the second image has a second background color. In one embodiment, a user may provide the first image and the second image via a user interface 129 (FIG. 1) rendered on a display 116 (FIG. 1) of a computing device 103 (FIG. 1). Then, in step 806, the interpolation application 123 pastes the first image on the second image at a specified location. For instance, the user may have indicated a location on the second image at which to paste the first image via one or more input devices 119 (FIG. 1).

In step 809, the interpolation application 123 generates a seamless composition comprising the first image pasted on the second image. In one embodiment, the interpolation application 123 identifies a set of pixels along a composition boundary between the first image and the second image to be defined pixels and another set of pixels to be undefined pixels. For example, the defined pixels may correspond to the second background color and the undefined pixels may correspond to the first background color. The interpolation application 123 then recursively down samples the boundary portion by a sampling factor to produce a plurality of down sampled boundary portions until the down sampled boundary portion produced at the recursive down sampling instance lacks defined pixels. The interpolation application 123 then recursively up samples each one of the down sampled boundary portions by the sampling factor to create an up sampled image from the respective down sampled boundary portion. Then, at each recursive up sampling instance, the interpolation application 123 pastes the next recursively occurring down sampled boundary portion on the up sampled image to create the next recursively occurring boundary portion for the up sampling.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
   receiving an original image comprised of a plurality of pixels, the image having a plurality of undefined pixels and a plurality of defined pixels;
   recursively down sampling, using a processor, the image by a sampling factor to produce a plurality of down sampled images until the last down sampled image produced at each recursive down sampling instance lacks undefined pixels;

storing, using the processor, each recursively down sampled image, wherein the last down sampled instance is a smallest down sampled image;

recursively up sampling, using the processor, each one of the down sampled images by the sampling factor to create an up sampled image from the respective down sampled image; and at each recursive up sampling instance, pasting, using the processor, a next recursively occurring down sampled image on top of the up sampled image to create the next recursively occurring image for up sampling, wherein said pasting comprises:

identifying one or more portions of the next recursively occurring down sampled image that comprises undefined pixels; and replacing the identified undefined pixels with the defined pixels of a corresponding portion of the up sampled image.

2. The computer-implemented method of claim 1, wherein the next recursively occurring image for up sampling lacks undefined pixels.

3. The computer-implemented method of claim 1, wherein down sampling the image by the sampling factor comprises reducing, using the processor, a resolution associated with the image by the sampling factor.

4. The computer-implemented method of claim 1, wherein up sampling the down sampled image by the sampling factor comprises increasing, using the processor, a resolution associated with the down sampled image by the sampling factor.

5. The computer-implemented method of claim 1, wherein down sampling the image by the sampling factor comprises:

identifying, using the processor, the undefined pixels in the image;

determining, using the processor, whether pixels adjacent to each of the undefined pixels are defined; and responsive to the determination that the adjacent pixels are defined, averaging, sing the processor, a value associated with the defined pixels to fill in the undefined pixels.

6. The computer-implemented method of claim 1, wherein the smallest down sampled image is associated with a smallest resolution with respect to the other down sampled images produced by the recursive down sampling.

7. A system comprising:

a processor for executing instructions stored in computer-readable medium on one or more devices, the application comprising one or more modules configured to perform the steps comprising:

receiving a first image to be pasted on a second image, the first image having a first background color and the second image having a second background color;

pasting the first image on the second image at a specified location; and generating a seamless composition comprising the first image pasted on the second image, wherein the first background color of the first image and the second background color of the second image are adjusted along a boundary portion between the first image and the second image to generate the seamless composition with a seamless transition between the first image and the second image.

8. The system of claim 7, wherein generating the seamless composition comprises:

identifying a set of defined pixels of the boundary portion and a set of undefined pixels of the boundary portion, the defined pixels corresponding to the second background color and the undefined pixels corresponding to the first background color;

recursively down sampling the boundary portion by a sampling factor to produce a plurality of down sampled boundary portions until the down sampled boundary portions produced at the recursive down sampling instance lacks undefined pixels;

recursively up sampling each one of the down sampled boundary portions by the sampling factor to create an up sampled boundary portion from the respective down sampled image; and at each recursive up sampling instance, pasting a next recursively occurring down sampled boundary portion on the up sampled image to create the next recursively occurring boundary portion for up sampling.

9. The system of claim 8, further comprising:

storing each recursively down sampled boundary portion, wherein a smallest down sampled boundary portion lacks undefined pixels.

10. The system of claim 8, wherein pasting the next recursively occurring down sampled image on the up sampled image comprises:

identifying one or more portions of the next recursively occurring down sampled image comprises undefined pixels; and replacing the identified portions with defined pixels of a corresponding portion of the up sampled boundary portion.

11. The system of claim 7, wherein down sampling the boundary portion by the sampling factor comprises reducing a resolution of the portion by the sampling factor.

12. The system of claim 7, wherein up sampling the boundary portion by the sampling factor comprises increasing a resolution of the portion by the sampling factor.

13. The system of claim 8, wherein down sampling the portion by the factor comprises:

identifying the undefined pixels of the portion;

determining whether pixels adjacent to each of the undefined pixels are defined pixels; and responsive to the determination that the adjacent pixels are defined pixels, averaging a value associated with the defined pixels to fill in the undefined pixels.

14. The system of claim 8 wherein the smallest down sampled boundary portion is associated with a smallest resolution with respect to the other down sampled boundary portions produced by the recursive down sampling.

15. A non-transitory computer-readable medium on which is encoded program code, the program code comprising:

program code for receiving an image with a set of undefined pixels and a set of defined pixels; and program code for recursively modifying the image to generate a seamless composition comprising only defined pixels, said generating comprising:

recursively down sampling the image by a sampling factor to generate a plurality of down sampled images until the down sample image generated at each recursive down sampling lacks undefined pixels;

recursively up sampling each one of the down sampled images by the sampling factor to generate an up sampled image from the respective down sampled image; and at each recursive up sampling instance, pasting a next recursively occurring down sampled image on the up sampled image to generate the next recursively occurring image for up sampling, wherein said pasting comprises:

identifying one or more portions of the next recursively occurring down sampled image that comprises undefined pixels; and replacing the identified undefined pixels with the defined pixels of a corresponding portion of the up sampled image.

16. The non-transitory computer-readable medium of claim 15, wherein down sampling the image by the sampling factor comprises:

identifying the undefined pixels in the image;

determining whether pixels adjacent to each of the undefined pixels are defined; and responsive to the determination that the adjacent pixels are defined, averaging a value associated with the defined pixels to fill in the respective undefined pixel.

17. The non-transitory computer-readable medium of claim 15, further comprising storing each recursively down sampled image in a data store accessible to the non-transitory computer-readable medium.

\* \* \* \* \*

UNITED STATES PATENT AND TRADEMARK OFFICE
CERTIFICATE OF CORRECTION

| | | |
|---|---|---|
| PATENT NO. | : 9,036,909 B2 | Page 1 of 1 |
| APPLICATION NO. | : 13/815053 | |
| DATED | : May 19, 2015 | |
| INVENTOR(S) | : Paris et al. | |

It is certified that error appears in the above-identified patent and that said Letters Patent is hereby corrected as shown below:

On the title page of the patent beside the paragraph beginning with "(73) Assignee:"

Delete "Adove"
Insert --Adobe--

Claims

Column 13, Claim 5, Line 40

Delete "sing"
Insert --using--

Signed and Sealed this
Sixth Day of October, 2015

Michelle K. Lee
*Director of the United States Patent and Trademark Office*